United States Patent
Sawicki

(10) Patent No.: US 8,616,407 B2
(45) Date of Patent: Dec. 31, 2013

(54) FLIP-TOP PREFORM FOR BLOW MOLDING

(71) Applicant: TricorBraun Inc., St. Louis, MO (US)

(72) Inventor: Craig R. Sawicki, Roselle, IL (US)

(73) Assignee: TricorBraun, Inc., St. Louis, MO (US)

( * ) Notice: Subject to any disclaimer, the term of this patent is extended or adjusted under 35 U.S.C. 154(b) by 0 days.

(21) Appl. No.: 13/650,229

(22) Filed: Oct. 12, 2012

(65) Prior Publication Data

US 2013/0105481 A1    May 2, 2013

Related U.S. Application Data

(63) Continuation-in-part of application No. 13/281,625, filed on Oct. 26, 2011.

(60) Provisional application No. 61/408,360, filed on Oct. 29, 2010.

(51) Int. Cl.
  *B65D 43/16*    (2006.01)

(52) U.S. Cl.
  CPC .................................. *B65D 43/169* (2013.01)
  USPC ........................... 220/837; 215/237; 428/35.7

(58) Field of Classification Search
  CPC .... B65D 43/169; B65D 43/163; B65D 43/16; B65D 47/0804; B65D 47/08
  USPC ........ 220/837, 836, 810, 254.3, 254.1, 257.1, 220/256.1, 257.2, 270, 266, 265, 259.1, 220/659, 658, 657, 200; 215/237, 235, 254, 215/253, 250, 43, 42, 200
  IPC ............................................. B65D 43/16,51/04
  See application file for complete search history.

(56) References Cited

U.S. PATENT DOCUMENTS

| | | | | |
|---|---|---|---|---|
| 3,155,269 | A | * | 11/1964 | Schurman et al. ............ 220/837 |
| 3,252,492 | A | * | 5/1966 | Marchant ...................... 215/235 |
| 6,398,067 | B1 | * | 6/2002 | Belfance et al. .............. 220/833 |
| 7,404,495 | B2 | * | 7/2008 | Keung ........................... 215/237 |

FOREIGN PATENT DOCUMENTS

JP    2006151454 A   *  6/2006    ............ B65D 43/16

* cited by examiner

*Primary Examiner* — Robert J Hicks
(74) *Attorney, Agent, or Firm* — H. Frederick Rusche; Husch Blackwell LLP

(57) ABSTRACT

A preform for blow molding a plastic container, and the resulting container, with a flip-top closure includes a container portion and a flip-top closure base portion integrally molded with the container portion. The flip-top closure base portion includes an integrally molded first hinge structure for connecting the flip-top closure base portion to a second hinge structure on a flip-top closure top to create the flip-top closure for the container.

10 Claims, 5 Drawing Sheets

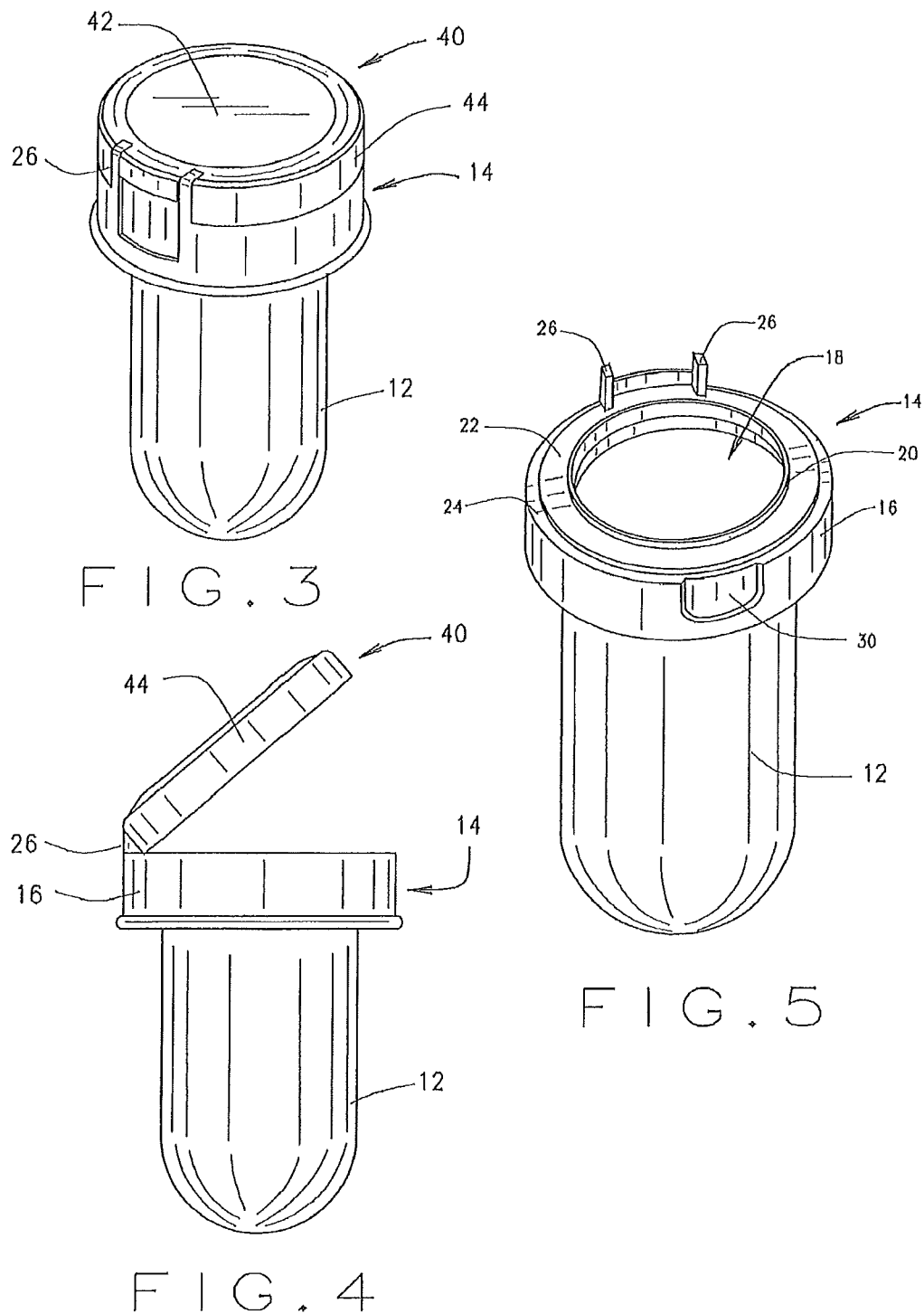

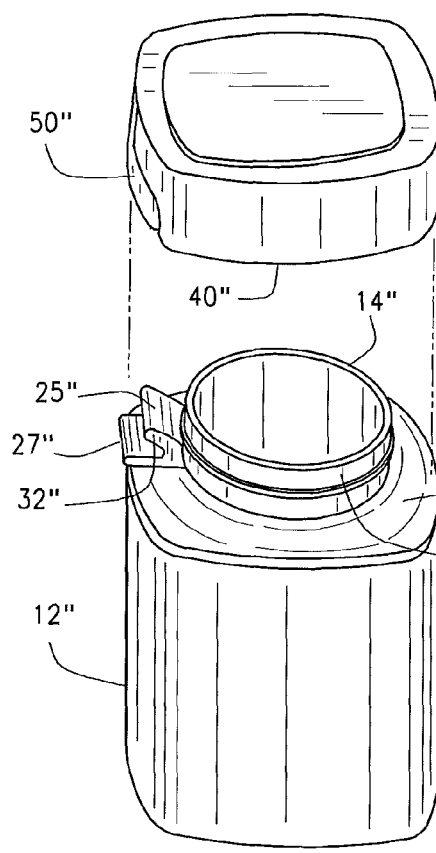
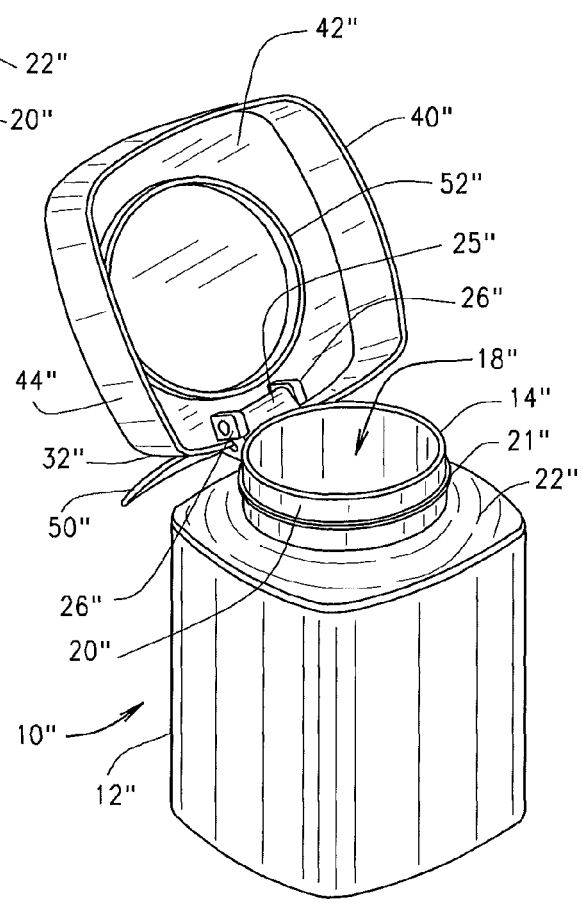
FIG. 8
FIG. 9

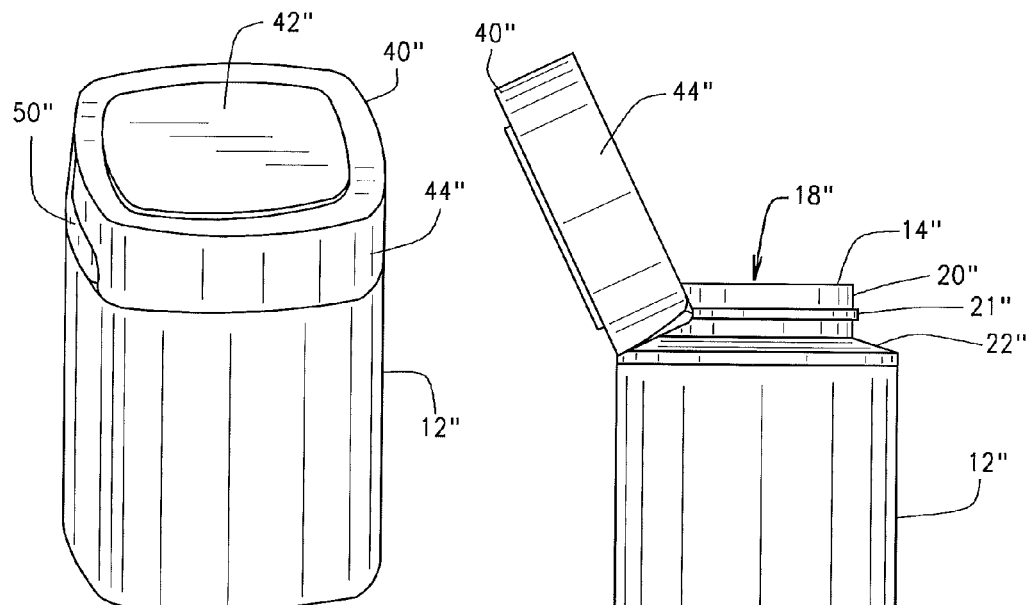
FIG. 10
FIG. 11
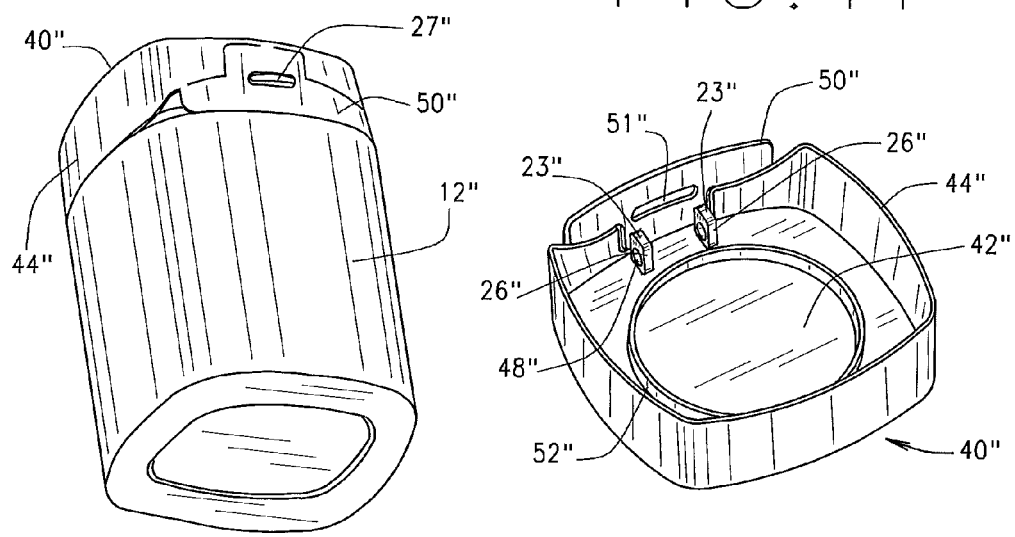
FIG. 12
FIG. 13

FLIP-TOP PREFORM FOR BLOW MOLDING

CROSS REFERENCE

This application is a continuation-in-part of and claims priority to U.S. application Ser. No. 13/281,625 filed Oct. 26, 2011, which in turn claims priority to U.S. Provisional Patent Application No. 61/408,360, filed Oct. 29, 2010.

TECHNICAL FIELD OF THE INVENTION

The present invention relates generally to the field of blow molding plastic containers and, more particularly, to an improved preform for blow molding plastic containers.

BACKGROUND OF THE INVENTION

Injection blow molding is a commonly used manufacturing process for producing hollow plastic parts from thermoplastic material. Injection blow molding can be used to produce plastic containers, most frequently small medical and single serve bottles. In general, the blow molding process involves melting down a thermoplastic material and forming it into a parison or preform. The perform is typically a tube-like piece of plastic with a hole in one end to accommodate the introduction of compressed air. The preform is heated and a pressurized gas, usually air, is used to expand the hot preform and press it against the interior of a mold cavity. The pressure within the preform is maintained until the plastic cools and solidifies in the desired shape at which time the mold is opened to release the newly formed container.

In the past, finishing of a blow molded container, for example the addition of closure structures, has occurred entirely in separate, subsequent operations. This is particularly true in the case of containers using flip-top closures. The flip-top closure is molded or otherwise manufactured separately. It is then added to the already blow molded container by any number of known means. An example of a prior art container manufactured by the prior art method is provided in FIG. 1. While this method of assembly is widely used, it does require multiple manufacturing steps and generally requires the use of a greater amount of plastic material than might otherwise be necessary. This latter quality in particular can be a significant drawback for projects where sustainable manufacturing is a key metric.

Therefore, it would be advantageous to provide a means for improving the process for injection blow molding of containers and that addresses one or more of the problems set forth above.

SUMMARY OF THE INVENTION

One aspect of the invention generally pertains to an improved preform for producing blow-molded plastic containers.

Another aspect of the invention pertains to a preform for blow molding plastic flip-top containers that reduces the amount of plastic required for manufacturing.

In accordance with the above aspects of the invention, there is provided a preform for blow molding a plastic container with a flip-top closure that includes a container portion and a flip-top closure base portion integrally molded with the container portion. The flip-top closure base portion includes an integrally molded first hinge structure for connecting the flip-top closure base portion to a second hinge structure of a flip-top closure top to create the flip-top closure for the container.

In another embodiment, there is provided a plastic, blow-molded container produced from a preform that includes a container portion and a flip-top closure base portion integrally molded with the container portion. The flip-top closure base portion includes an integrally molded first hinge structure for connecting the flip-top closure base portion to a second hinge structure of a flip-top closure top to create the flip-top closure for the container.

In another embodiment, there is provided a method of blow molding a flip-top closure container that includes the steps of molding a preform with a container portion and an integral flip-top closure base portion, wherein the flip-top closure base portion is integrally molded with a first hinge structure to facilitate a mating engagement with a flip-top closure top; inserting the preform into a blow mold; inflating the container portion of the preform within the blow mold; and removing the inflated preform from the blow mold.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 3 is a perspective view of a container with a flip-top closure produced with a preform according to an embodiment of the present invention.

FIG. 4 is a side view of the container of FIG. 2 with the flip-top closure in the open position.

FIG. 5 is an alternate perspective view of the preform of FIG. 2 with the closure removed.

FIG. 8 is a perspective view of a container with a flip-top closure produced with a preform according to an embodiment of the present invention.

FIG. 9 is a perspective view of the container of FIG. 8 with the flip-top closure attached and in an open position.

FIG. 10 is a perspective view of the container of FIG. 8 with the flip-top closure in a closed position.

FIG. 11 is a side view of the container of FIG. 8 with the closure in an open position.

FIG. 12 is an alternate perspective view from beneath the container with the closure in the closed position.

FIG. 13 is a perspective view of the underside of an upper portion of a flip-top closure that may be used with the lower portion of the closure shown in FIGS. 8-12.

DETAILED DESCRIPTION

Figure 1:
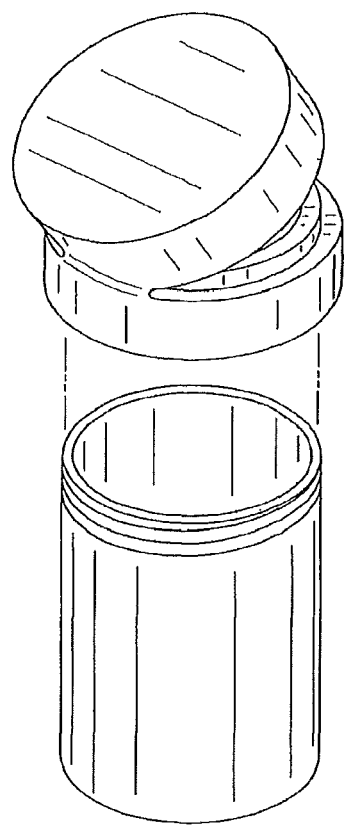
FIG. 1 is a perspective view of a container with a flip-top closure produced by the prior art blow molding process.

In the following detailed description numerous specific details are set forth in order to provide a thorough understanding of the invention. However, it will be understood by those skilled in the art that the present invention may be practiced without these specific details. For example, the invention is not limited in scope to the particular type of industry application depicted in the figures. In other instances, well-known methods, procedures, and components have not been described in detail so as not to obscure the present invention.

FIGS. 2-5 illustrate an embodiment of a preform 10 according to a first embodiment of the present invention. The preform 10 includes a container portion 12 and a closure base portion 14. The container portion 12 is tube-shaped and hollow in order to be compatible with existing injection blow molding equipment. The container portion 12 and closure base portion 14 are co-molded together.

The closure base portion 14 is the lower half of a flip-top closure. The closure base portion has an outer skirt 16 and a central opening 18 that communicates with the hollow interior of the container portion 12 of the preform 10. Surrounding the central opening 18 is a slightly upwardly extending collar 20. Surrounding the collar 20 is a generally flat, first horizontal surface 22. Outside of this first horizontal surface 22 is a second surface 24 that lies slightly below the level of the first surface 22. The closure base portion 14 also includes a matching pair of hinge members 26 extending upward from the upper surface of the closure base portion 14. These hinge members 26 provide a convenient point of attachment for the closure base portion 14 with a second portion of the closure.

In the illustrated embodiment, there is also provided a depressed area 28 in the outer skirt 16 between the hinge members 26. The depressed area 28 coordinates with a tab on the second portion of the closure as described below.

As shown in FIG. 5, opposite the hinge members 26 on the closure base portion 14 is a finger recess 30 that provides a user of the finished container with additional leverage for opening the flip-top closure of the container.

Figure 2:
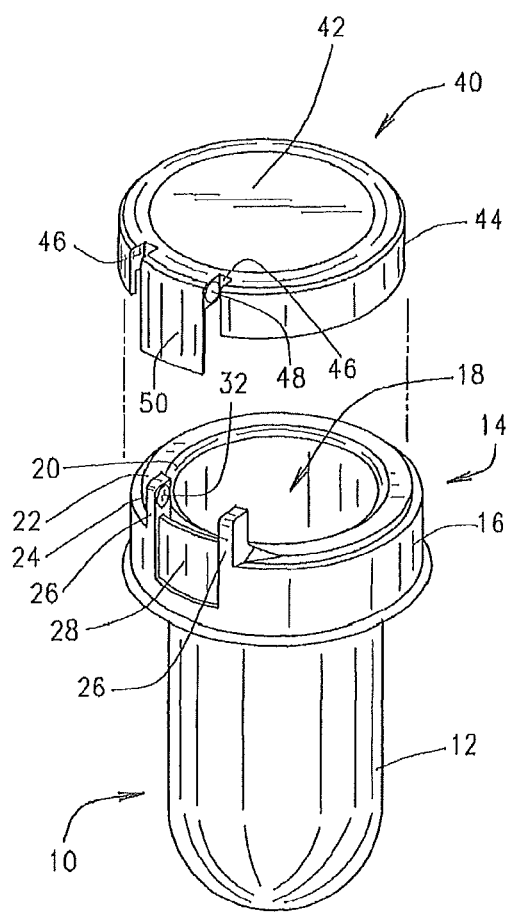
FIG. 2 is a perspective view of a preform according to an embodiment of the present invention.

As shown in FIG. 2, an additional component is provided for combination with the preform 10 to create a finished container. The additional component is the closure top 40 of the flip-top closure. The closure top 40 includes a generally flat, closed top surface 42. It also includes an outer skirt 44 extending nearly around the entirety of the top surface 42.

The outer skirt 44 and top surface 42 are provided with hinge openings or notches 46. The hinge openings 46 are sized and spaced to coordinate with the hinge members 26 of the closure base portion 14. Each of the hinge members 26 and hinge openings 46 are also provided with coordinating structures to secure the hinge members 26 within the hinge openings 46 while allowing rotational movement of the closure top 40 relative to the closure base portion 14. In the illustrated embodiment, the inner surfaces of the hinge members 26 are provided with ball protrusions 32. These ball protrusions 32 fit into detents 48 positioned in the inner side surfaces of the hinge openings 46 when the closure top 40 is mated with the closure base portion 14. It will be readily appreciated that the positioning of the ball protrusions 32 and detents 48 may be reversed to be in the hinge openings 46 and hinge members 26, respectively, without impacting the functioning of the finished closure. In general, the detents 48 allow the rotation of the ball protrusions 32 therewithin, thereby allowing the rotation of the closure top 40 relative to the closure base portion 14.

Those of skill in the art will readily recognize that the specific hinge structure above is non-limiting and different types of hinge structures may be used in the preform of the present invention.

In one advantageous embodiment as shown in FIG. 2, the closure top 40 may also incorporate a tamper-evident tab 50 positioned generally between the hinge openings 46. The tamper-evident tab 50 coordinates with the depressed area 28 in the outer skirt 16 of the closure base portion 14 to create a tamper-evident feature for the assembled flip-top closure. More particularly, the tamper-evident tab 50 extends below the level of the outer skirt 44 of the closure top 40. Thus, the tamper-evident tab 50 will interfere with the rotationally movement of the closure top 40 relative to the closure base portion 14 and must be removed in order for a user to open the flip-top closure. Once removed, there is no means for reattaching the tab 50 to the closure top 40. The resulting absence of the tab 50 provides an indication to a user that the flip-top closure has previously been opened.

The depressed area 28 is sized to match the dimensions of the tab 50. The coordinated fit of the depressed area 28 and tab 50 allows the tab 50 to fit within the general confines of the depressed area 28 such that the tab 50, the outer skirt 44 of the closure top 40, and the outer skirt 16 of the closure base portion 14 present a generally consistent cylindrical appearance until the tab 50 is removed, which is desirable for enhanced aesthetic performance of the finished container.

Figure 6:
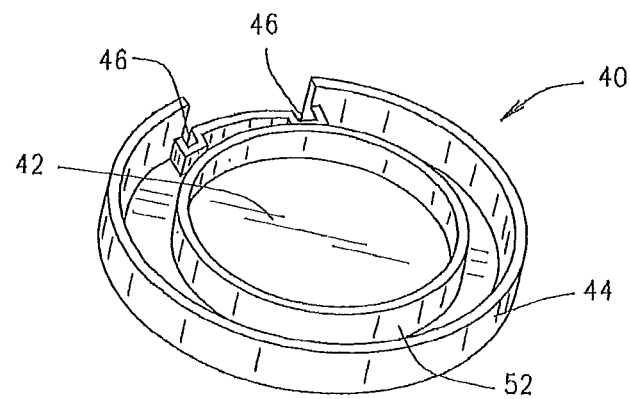
FIG. 6 is a perspective view of the underside of an upper portion of a flip-top closure that may be used with the lower portion of the closure shown in FIGS. 2-5.

FIGS. 5 and 6 further illustrate the details of the closure base portion 14 and closure top 40 as described above. FIG. 6 further illustrates features of the underside of the closure top 40. In addition to the structures described above, the closure top 40 includes an inner skirt 52. The inner skirt 52 coordinates with the collar 20 of the closure base portion 14 to create a seal when the flip-top closure is closed. FIG. 6 also illustrates the hinge openings 46 and outer skirt 44 of the second closure portion 40 from a different perspective.

Figure 7:
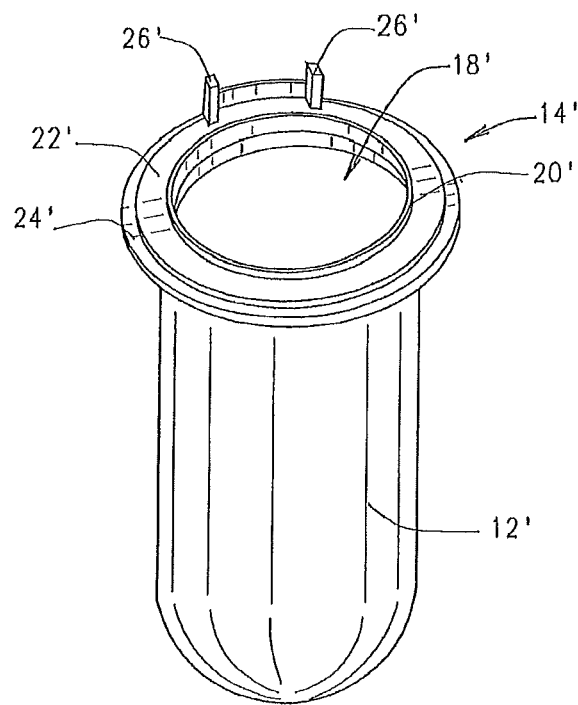
FIG. 7 is a perspective view of a preform according to an alternate embodiment.

FIG. 7 illustrates an alternate embodiment of a preform 10'. The preform 10' of FIG. 7 is similar in arrangement to the preform 10 of FIGS. 2-6. Therefore, FIG. 7 includes reference numerals identifying the corresponding elements of preform 10'. However, preform 10' lacks an outer skirt (ref. 16 in FIGS. 2-6) with its closure base portion 14'. Instead, the closure base portion 14' includes only central opening 18' that communicates with the hollow interior of the container portion 12' of the preform 10'. Surrounding the central opening 18' is a slightly upwardly extending collar 20'. Surrounding the collar 20' is a generally flat, first horizontal surface 22'. Outside of this first horizontal surface 22' is a second surface 24' that lies slightly below the level of the first surface 22'. The closure base portion 14' also includes a matching pair of hinge members 26' extending upward from the upper surfaces of the closure portion 14'. These hinge members 26' provide a convenient point of attachment for the closure base portion 14' with a top portion of the closure.

FIGS. 8-12 illustrate an alternate embodiment of the invention, in which the hinge members 26" are positioned on the closure top 40" rather than the closure base portion 14". As in the preceding embodiments, the preform 10" includes a container portion 12" connected with the closure base portion 14", which are co-molded together. However, in the case of the embodiments of FIGS. 8-12, the container is illustrated in a finished state.

The closure base portion 14" is the lower half of the flip-top closure. The closure base portion 14" has a central opening 18" that communicates with the hollow interior of the container portion 12" of the preform 10". The closure base portion 14" also has a collar 20", which in this case has a greater vertical height than in the preceding embodiments. The exterior surface of the collar 20" is provided with a bead 21". A flat, first horizontal surface 22" surrounds the collar 20". A hinge tab 25" extends outwardly from the exterior surface of the collar 20" at an angle relative to the collar 20". In the illustrated embodiment, the hinge tab 25" is arranged at angle of approximately 45° to the collar 20". On either side of the distal end of the hinge tab 25" there is provided a ball protrusion 32".

A security tab 27" also extends outwardly from the exterior surface of the collar 20". In the case of the security tab 27" however, it extends horizontally from the collar 20".

Again, the closure top 40" is arranged to coordinate with the closure base portion 14". The closure top 40" includes a generally flat, closed top surface 42" and an outer skirt 44" extending nearly around the entirety of the top surface 42". An inner skirt 52" extends from the inside of the top surface 42" and cooperates with the collar 20" of the closure base portion 14" to create a seal when the clip-top closure is in the closed position. Also extending downwardly from the interior of the top surface 42" is a pair of hinge members 26". Each hinge member 26" is provided with a slot 23" on the surface facing the other hinge members 26" and extending along the long axis of the hinge member 26" at the upper end of the slot 23" near the top surface 42", each hinge member 26" has a ball detent 48" arranged to accept the ball protrusions 30" of the hinge tab 25". The slots 23" guide the ball protrusions 30" as the hinge tab 25" and hinge members 26" are mated. The hinge members 26" are positioned at a distance from one another that corresponds to the width of the hinge tab 25". As with the preceding embodiments, the detents 48" allow the rotation of the ball protrusions 32" therewithin, thereby allowing the rotation of the closure top 40" relative to the closure base portion 14". Again, those of skill in the art will readily recognize that the specific hinge structure is non-limiting and different types of hinge structure may be used in the preform of the present invention.

At what may be considered to be the rear of the closure top 40", there is provided a roughly T-shaped break in the skirt 44". This break is filled with a break-away, tamper-evident tab 50" that is arranged to cooperate with the security tab 27" in the manner described below. The tamper-evident tab 50" is provided with an opening 51". The tamper-evident tab 50" is co-molded with the rest of the closure top 40" and connected thereto by means of flashing after molding. When initially molded, the tamper-evident tab 50" lies substantially flush with the rear portion of the skirt 44" within the T-shaped break.

When the closure top 40" is first mated to the closure base portion 14", the closure top 40" is pushed on to the closure base portion 14" in a substantially vertical downward movement. This allows the tamper-evident tab 50" to slide past the security tab 27" without being deflected significantly from its starting position. Once the closure top 40" is fully mated with the closure base portion 14", the end of the security tab 27" is positioned to rest within the opening of the tamper-evident tab 50". So long as the closure top 40" remains in a closed position, the tamper-evident tab 50" will be undisturbed. However, when the closure top 40" is rotated about the axis created by the detent/ball protrusion connection, the security tab 27" forces the tamper-evident tab 50" to be displaced from its starting position within the T-shaped break in the skirt 44", thereby breaking much of the flashing connecting the tamper-evident tab to the rest of the skirt 44". As with the preceding embodiment, the tamper-evident tab 50" interferes with the rotational movement of the closure top 40" relative to the closure base portion 14" unless removed. Once removed, there is no means for reattaching the tab 50" to the closure top 40". The resulting absence of the tab 50" provides an indication to a user that the flip-top closure has been previously opened.

In general, a preform as described above and resulting container are created as follows. The preform is formed by injection molding a thermoplastic material onto a core pin. The molten polymer is fed into a manifold where it is injected through nozzles into a hollow, heated preform mold. The preform mold forms the external shape and is clamped around the core pin which forms the internal shape of the preform. The preform is then transferred on the core pin into a blow molding station. The core pin opens and allows compressed air into the preform, which inflates it to the finished article shape. After a cooling period the blow mold opens and the core pin is rotated to the ejection position. The inflated preform/new container is stripped off the core pin and the second closure portion is attached to the first closure portion. The container is typically leak-tested prior to packing. The preform and blow molds can have several cavities depending on the article size and the required output.

The preferred embodiment of the invention has been described above to explain the principles of the invention and its practical application to thereby enable others skilled in the art to utilize the invention in the best mode known to the inventors. However, as various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

What is claimed is:

1. A preform for blow molding a plastic container with a flip-top closure, comprising:
    a container portion;
    a flip-top closure base portion integrally molded with said container portion, said flip-top closure base portion further comprising an integrally molded first hinge structure, said hinge structure arranged for mating engagement with a second hinge structure of a flip-top closure top; and
    wherein said flip-top closure base portion further comprises an upwardly extending collar and wherein said first hinge structure further comprises a hinge tab extending outwardly from said collar.

2. The preform for blow molding a plastic container as set forth in claim 1, wherein said hinge tab is arranged at an acute angle relative to said collar.

3. The preform for blow molding a plastic container as set forth in claim 1, further comprising a security tab extending outwardly from said collar adjacent to said hinge tab, said security tab arranged for engagement with a tamper-evident tab structure on said flip-top closure top.

4. The preform for blow molding a plastic container as set forth in claim 1, wherein said hinge tab further comprises a pair of a ball protrusions to facilitate mating engagement with said second hinge structure of said flip-top closure top.

5. A blow-molded, plastic container, comprising:
    a blow-molded container body;
    a flip-top closure base portion integrally molded with said container body in a preform, said flip-top closure base portion further comprising an integrally molded first hinge structure; and
    wherein said flip-top closure base portion further comprises an upwardly extending collar and wherein said first hinge structure further comprises a hinge tab extending outwardly from said collar.

6. The blow-molded, plastic container as set forth in claim 5, further comprising a flip-top closure top comprising a second hinge structure, said first and second hinge structures arranged for mating engagement to rotatingly connect said flip-top closure top with said flip-top closure base portion.

7. The blow-molded plastic container as set forth in claim 5, wherein said hinge tab is arranged at an acute angle relative to said collar.

8. The blow-molded, plastic container as set forth in claim 6, wherein said second hinge structure further comprises a pair of hinge members extending downwardly from an inside surface of said flip-top closure top, said hinge members cooperating to receive said hinge tab of said flip-top closure base portion.

9. The blow-molded, plastic container as set forth in claim 8, wherein each of said hinge members further comprises a longitudinal slot in a surface thereof and a ball detent in communication with said slot.

10. The blow-molded, plastic container as set forth in claim 5, wherein:

said closure base portion further comprises a security tab extending outwardly from said collar adjacent to said hinge tab, said security tab arranged for engagement with a tamper-evident tab structure on said flip-top closure top; and said flip-top closure top further comprises an outer skirt extending downwardly from a top surface of said flip-top closure top and having a break therein, and a tamper-evident tab structure arranged within said break, said tamper-evident tab structure being temporarily connected with said outer skirt, said tamper-evident tab structure defining an opening therethrough arranged for engagement with a distal end of said security tab when said flip-top closure top and the flip-top closure base portion are initially connected in a closed position.

* * * * *